(12) United States Patent
Karaoguz et al.

(10) Patent No.: US 9,680,545 B2
(45) Date of Patent: *Jun. 13, 2017

(54) MULTI-TRANSCEIVER SYSTEM WITH MIMO AND BEAM-FORMING CAPABILITY

(75) Inventors: Jeyhan Karaoguz, Irvine, CA (US); Nambirajan Seshadri, Irvine, CA (US); James D. Bennett, San Clemente, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 240 days.

This patent is subject to a terminal disclaimer.

(21) Appl. No.: 13/478,928

(22) Filed: May 23, 2012

(65) Prior Publication Data

US 2012/0230442 A1    Sep. 13, 2012

Related U.S. Application Data

(63) Continuation of application No. 13/026,442, filed on Feb. 14, 2011, now Pat. No. 8,233,941, which is a (Continued)

(51) Int. Cl.
  *H04Q 7/10*     (2006.01)
  *H04B 7/06*     (2006.01)

(52) U.S. Cl.
  CPC ................ *H04B 7/0617* (2013.01)

(58) Field of Classification Search
  CPC ...... H04W 16/28; H04W 16/30; H04W 16/32
  (Continued)

(56) References Cited

U.S. PATENT DOCUMENTS

| 6,564,066 B1 | 5/2003 | Biggs et al. |
| 6,744,743 B2 | 6/2004 | Walton et al. |

(Continued)

FOREIGN PATENT DOCUMENTS

CN    1215514    4/1999

OTHER PUBLICATIONS

European Search Report corresponding to European Patent App. No. 05011272 dated Dec. 2, 2009.

*Primary Examiner* — Ajit Patel
*Assistant Examiner* — Julio Perez
(74) *Attorney, Agent, or Firm* — Foley & Lardner LLP

(57) ABSTRACT

A system and method for communicating with a second communication system utilizing a plurality of antennas. Various aspects of the present invention may comprise determining whether communicating with the second communication system utilizing a plurality of antennas in a first configuration, which comprises a beam-forming configuration, is preferable to utilizing a plurality of antennas in a second configuration, which comprises a MIMO or MISO configuration. If it is determined that the first configuration is preferable to the second configuration, the communication system may be configured to communicate with the second communication system by utilizing at least a portion of the plurality of antennas in the first configuration. If it is determined that the second configuration is preferable to the first configuration, then the communication system may be configured to communicate with the second communication system by utilizing at least a portion of the plurality of antennas in the second configuration.

18 Claims, 5 Drawing Sheets

Related U.S. Application Data continuation of application No. 12/250,119, filed on Oct. 13, 2008, now Pat. No. 7,890,143, which is a continuation of application No. 11/092,349, filed on Mar. 29, 2005, now Pat. No. 7,440,777.

(60) Provisional application No. 60/601,457, filed on Aug. 13, 2004.

(58) Field of Classification Search
 USPC ......... 455/562.1, 575.1, 422, 424, 101, 272
 See application file for complete search history.

(56) References Cited

U.S. PATENT DOCUMENTS

| | | | |
|---|---|---|---|
| 6,751,187 B2 | 6/2004 | Walton et al. | |
| 6,801,790 B2* | 10/2004 | Rudrapatna | 455/562.1 |
| 6,802,035 B2 | 10/2004 | Catreux et al. | |
| 7,047,016 B2 | 5/2006 | Walton et al. | |
| 7,215,635 B2* | 5/2007 | Song | H04J 11/003 |
| | | | 370/208 |
| 7,248,841 B2* | 7/2007 | Agee et al. | 455/101 |
| 7,280,804 B2 | 10/2007 | Jacobsen et al. | |
| 7,299,070 B2 | 11/2007 | Karaoguz et al. | |
| 7,301,924 B1 | 11/2007 | Gurbuz et al. | |
| 7,324,943 B2* | 1/2008 | Rigazio et al. | 704/270 |
| 7,440,777 B2 | 10/2008 | Karaoguz et al. | |
| 7,565,173 B2 | 7/2009 | Karaoguz et al. | |
| 7,711,374 B2 | 5/2010 | Karaoguz et al. | |
| 7,890,143 B2 | 2/2011 | Karaoguz et al. | |
| 8,908,496 B2* | 12/2014 | Kadous | 370/216 |
| 2002/0085643 A1* | 7/2002 | Kitchener | H04B 7/0417 |
| | | | 375/267 |
| 2002/0193146 A1* | 12/2002 | Wallace et al. | 455/562 |
| 2003/0087673 A1 | 5/2003 | Walton et al. | |
| 2003/0128658 A1 | 7/2003 | Walton et al. | |
| 2003/0161282 A1* | 8/2003 | Medvedev | H04B 7/0417 |
| | | | 370/329 |
| 2003/0223391 A1 | 12/2003 | Malaender et al. | |
| 2004/0176097 A1 | 9/2004 | Wilson et al. | |
| 2005/0047384 A1 | 3/2005 | Wax et al. | |
| 2005/0101352 A1 | 5/2005 | Logothetis et al. | |
| 2005/0170862 A1 | 8/2005 | Fukushima | |
| 2005/0232208 A1 | 10/2005 | Hansen | |
| 2006/0035653 A1 | 2/2006 | Karaoguz et al. | |
| 2006/0035674 A1 | 2/2006 | Karaoguz et al. | |
| 2006/0035675 A1 | 2/2006 | Karaoguz et al. | |
| 2006/0121946 A1 | 6/2006 | Walton et al. | |
| 2008/0002781 A1 | 1/2008 | Karaoguz et al. | |
| 2009/0042614 A1 | 2/2009 | Karaoguz et al. | |
| 2009/0280821 A1 | 11/2009 | Karaoguz et al. | |
| 2010/0210279 A1 | 8/2010 | Karaoguz et al. | |
| 2011/0002411 A1* | 1/2011 | Forenza et al. | 375/267 |
| 2011/0317625 A1* | 12/2011 | Urquhart et al. | 370/328 |

* cited by examiner

MULTI-TRANSCEIVER SYSTEM WITH MIMO AND BEAM-FORMING CAPABILITY

CROSS-REFERENCE TO RELATED APPLICATIONS/INCORPORATION BY REFERENCE

This patent application is a continuation of U.S. patent application Ser. No. 13/026,442, filed Feb. 14, 2011; which is a continuation of U.S. patent application Ser. No. 12/250,119, filed Oct. 13, 2008, now U.S. Pat. No. 7,890,143; which is a continuation of U.S. patent application Ser. No. 11/092,349, filed Mar. 29, 2005, now U.S. Pat. No. 7,440,777; which makes reference to, claims priority to and claims benefit from U.S. provisional patent application Ser. No. 60/601,457, filed Aug. 13, 2004, and titled "MULTI-TRANSCEIVER SYSTEM WITH MIMO AND BEAM-FORMING CAPABILITY," the contents of each of which are hereby incorporated herein by reference in their entirety. This patent application is related to U.S. Pat. No. 7,711,374; U.S. patent application Ser. No. 12/768,879, filed Apr. 28, 2010, entitled "DYNAMIC RECONFIGURATION OF COMMUNICATION RESOURCES IN A MULTI-TRANSCEIVER CONFIGURATION"; U.S. Pat. No. 7,299,070; U.S. Pat. No. 7,565,173; U.S. Pat. No. 8,126,503; and U.S. patent application Ser. No. 13/404,599, filed on Feb. 24, 2012, entitled "DYNAMIC MIMO RESOURCE ALLOCATION DURING A SINGLE COMMUNICATION."

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various communication systems may utilize single antenna, single transmission path communications. Various other communication systems may utilize multiple-antenna multiple-transmission path communications (e.g., Multiple Input Multiple Output "MIMO" communications). Such communication systems may work well in some communication scenarios and not work well in other communication scenarios. Various other communication systems may utilize multiple antennas for beam-forming communications. Such communication systems may work well in some communication scenarios and not work well in other communication scenarios.

Current multi-antenna communication systems generally fail to take advantage of potential communication flexibility that multi-antenna communication configurations offer. For example, a communication system utilizing multiple antennas for MIMO communications might not perform well in rural environments.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for communicating with a second communication system utilizing a plurality of antennas, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
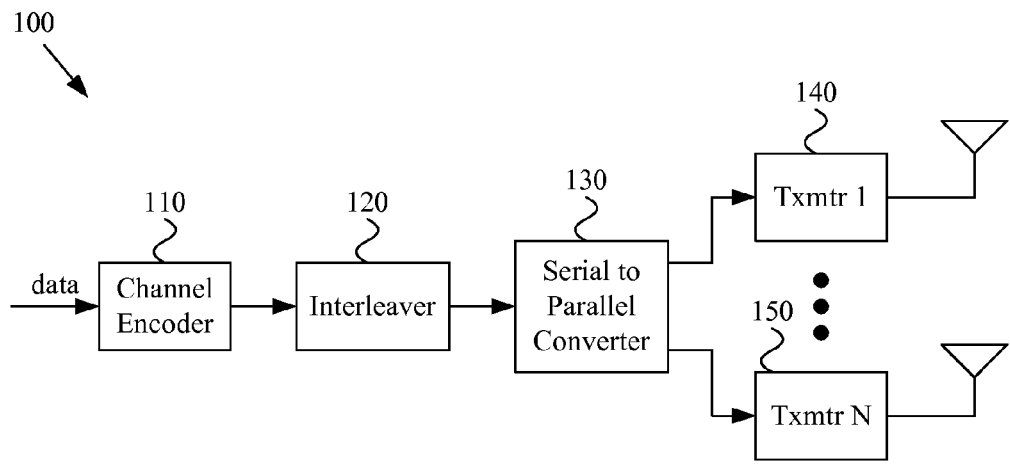
FIG. 1 is a diagram illustrating an exemplary MIMO transmitting configuration.
Figure 2:
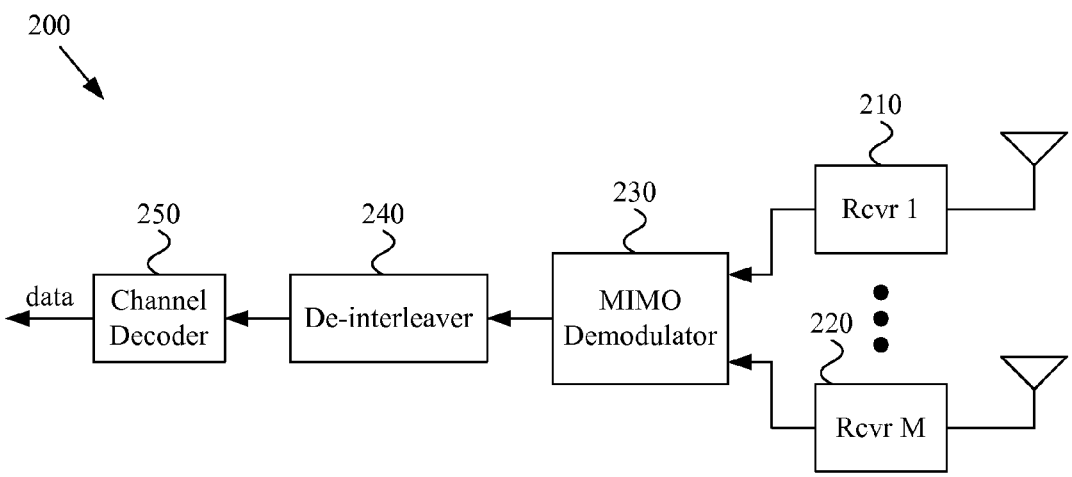
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited to MIMO, Multiple-Input-Single-Output ("MISO"), or Single-Input-Single-Output ("SISO") communication systems or characteristics thereof.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, etc. The channel encoder 110 may comprise any of a variety of encoder types. For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210-220 may provide the simultaneously received signals to a MIMO demodulator 230. The MIMO demodulator 230 may provide a serial stream of information to a de-interleaver 240 and to a channel decoder 250 to convert the received signals into output data.

Note that the exemplary MIMO systems illustrated in FIGS. 1 and 2 are merely illustrative examples of basic MIMO systems. It should be noted that a MIMO system may comprise many various alternative configurations. Further it should be noted that many characteristics of MIMO systems are shared with MISO systems.

Figure 3:
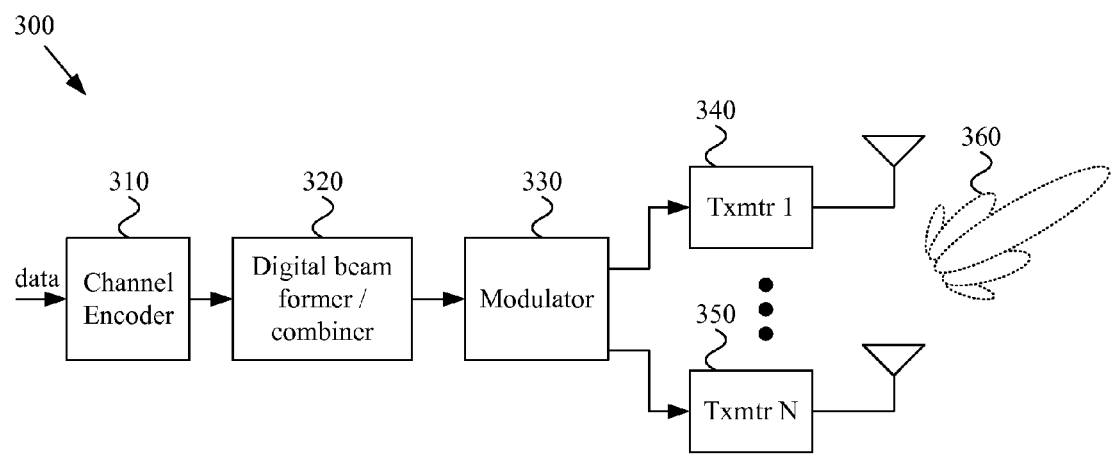
FIG. 3 is a diagram illustrating an exemplary communication system having a beam-forming configuration.

FIG. 3 is a diagram illustrating an exemplary communication system 300 having an exemplary beam-forming configuration. The channel encoder 310 receives data. The data may comprise any of a variety of data types, including but not limited to, audio data, video data, textual data, graphical data, pictorial data, etc. The channel encoder 310 may comprise any of a variety of encoder types. For example and without limitation, the channel encoder 310 may comprise characteristics of a conventional encoder, error correction encoder, etc.

The exemplary system 300 may comprise a beam former and/or combiner 320 (e.g., a digital beam-former and/or combiner) that receives the encoded data from the channel encoder 310. The beam former/combiner 320 may, for example, form parallel signals (e.g., N signals) that, when ultimately transmitted through corresponding transmitters and antennas, focus transmission energy in a particular direction. The outputs of the beam former/combiner 320 may be modulated by a modulator 330 and communicated to a plurality of transmitters (e.g., transmitter 340 through transmitter 350) and respective antennas for transmission. As illustrated by the exemplary antenna gain pattern 360, the energy of the transmitted plurality of signals may constructively combine to focus composite transmission energy in a particular direction.

As with the exemplary MIMO systems 100, 200 illustrated in FIGS. 1-2, the exemplary communication system 300 with beam-forming capability is merely exemplary. For example, a communication system utilizing beam-forming may be constructed in many alternative configurations. Accordingly, the scope of various aspects of the present invention should not be limited by characteristics of the exemplary communication system 300 illustrated in FIG. 3.

Figure 4:
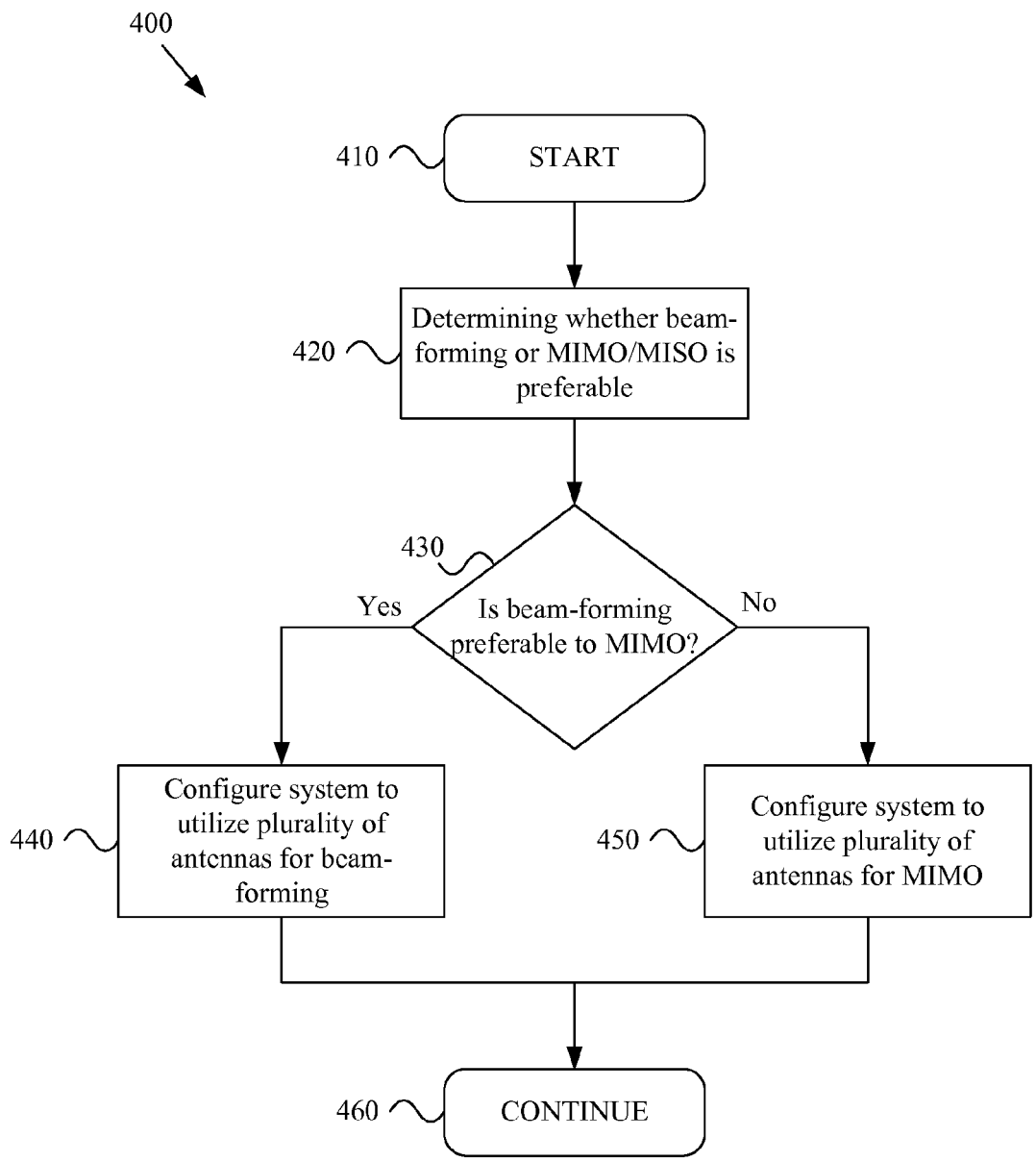
FIG. 4 is a diagram illustrating an exemplary method, in a communication system, for utilizing a plurality of antennas to communicate, in accordance with various aspects of the present invention.
Figure 5:
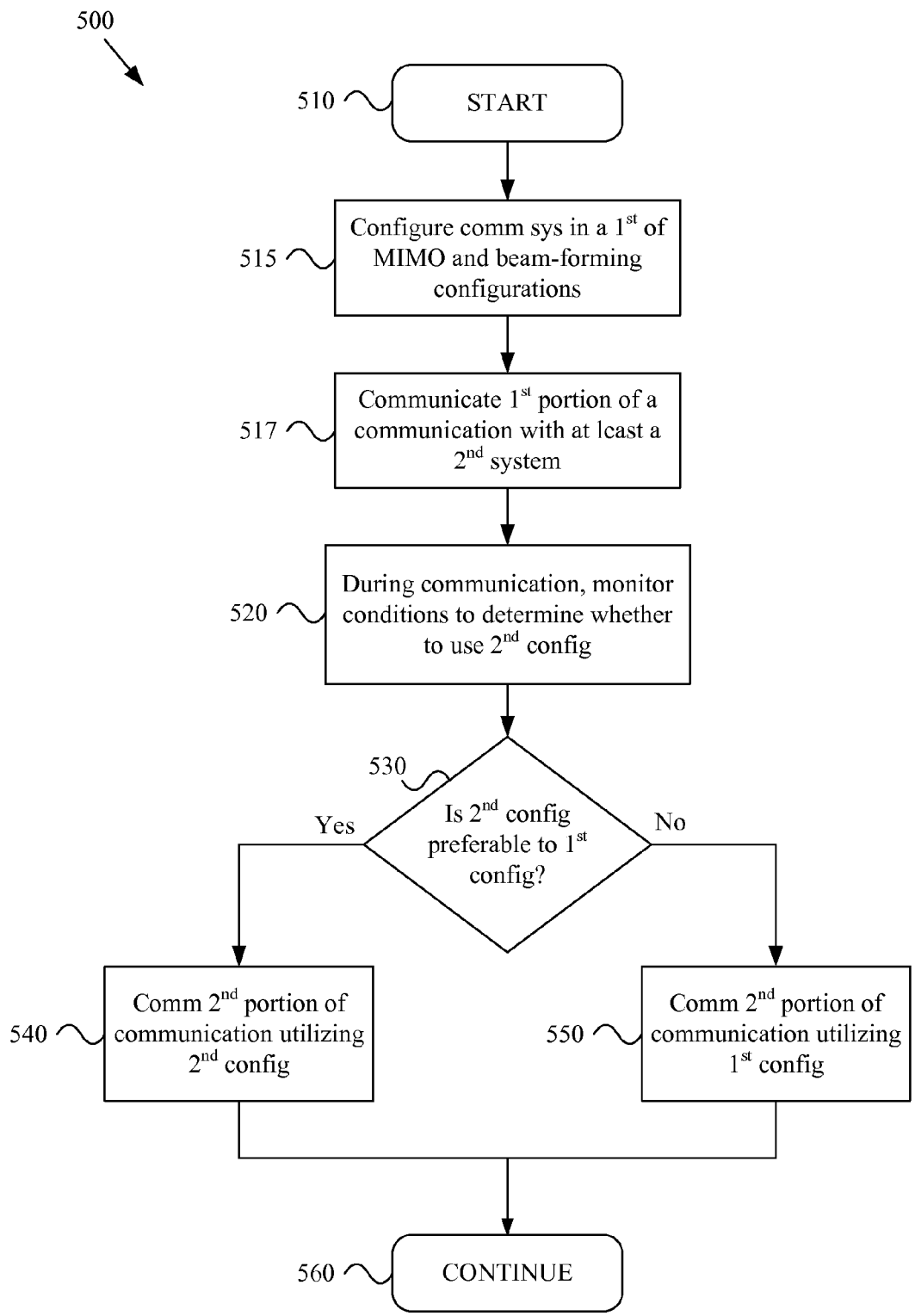
FIG. 5 is a diagram illustrating an exemplary method, in a communication system, for utilizing a plurality of antennas to communicate, in accordance with various aspects of the present invention.
Figure 6:
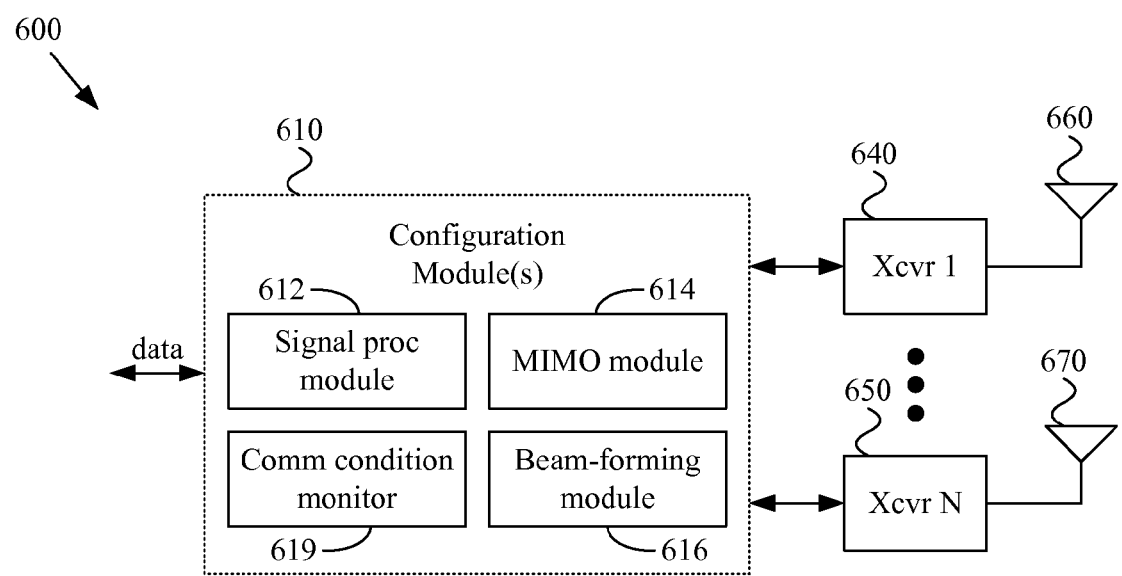
FIG. 6 is a diagram illustrating an exemplary communication system that utilizes a plurality of antennas to communicate, in accordance with various aspects of the present invention.

The following exemplary illustrations, in FIGS. 4-6, will be presented in an exemplary scenario that comprises two multi-antenna communication configurations (e.g., a beam-forming configuration and a MIMO or MISO configuration). It should be noted that the exemplary scenarios include only two configurations for the sake of illustrative simplicity. For example, the following discussion is readily extensible to three-configuration or n-configuration scenarios. Accordingly, the scope of various aspects of the present invention should not be limited by characteristics of only two-configuration scenarios.

FIG. 4 is a diagram illustrating an exemplary method 400, in a communication system, for utilizing a plurality of antennas to communicate, in accordance with various aspects of the present invention. The exemplary method 400 may be implemented by any of a variety of communication systems that comprise a plurality of transceivers and/or antennas. For example and without limitation, the method 400 may be implemented by various modules or systems of a communication network (e.g., a base station, access point, or central controller). Also for example, the method 400 may be implemented by a fixed or portable communication system that communicates with a communication network. Accordingly, the scope of various aspects of the present invention should not be limited by characteristics of a particular communication system that may implement the exemplary method 400.

The exemplary method 400 may begin executing at step 410. The exemplary method 400 (and other methods discussed herein, for example, exemplary method 500) may begin executing for any of a variety of reasons. For example and without limitation, the exemplary method 400 may begin in response to a user or automated input initiating a communication. Also for example, the exemplary method 400 may begin in response to a message arriving from another communication system. Further for example, the exemplary method 400 may begin in response to one or more detected communication environment characteristics. Accordingly, the scope of various aspects of the present invention should not be limited by characteristics of any particular initiating cause or condition.

Portions of the following discussion will include illustrations of a communication system implementing the exemplary method 400 communicating with a second communication system. Such a one-to-one communication scenario is presented for illustrative clarity and should not limit the scope of various aspects of the present invention to characteristics of a one-to-one communication scenario. For example and without limitation, various aspects of the present invention also may apply to broadcast and multi-cast communication scenarios.

The exemplary method 400 may, at step 420, comprise determining whether communicating with a second communication system utilizing a plurality of antennas in a first configuration, which comprises a beam-forming configuration, is preferable to utilizing a plurality of antennas in a second configuration, which comprises either of a MIMO or MISO configuration. Step 420 may comprise making such determination in any of a variety of manners, non-limiting illustrative examples of which are presented below.

For example, step 420 may comprise determining whether the first configuration is preferable to the second configuration based, at least in part, on energy or power consumption associated with utilizing the first configuration and energy or power consumption associated with utilizing the second configuration. For example, depending on the particular communication scenario, a beam-forming configuration may correspond to the utilization of more or less energy or power than a MIMO or MISO configuration. Step 420 may (e.g., in an communication scenario involving a finite energy source) comprise determining to utilize the configuration that corresponds with the lowest amount of energy or power utilization while meeting a particular quality goal. Step 420 may also (e.g., in a communication scenario involving a finite energy source) comprise determining and considering the amount of energy or power presently available for communication or anticipated to be available for communication.

Also for example, step 420 may comprise determining whether the first configuration is preferable to the second configuration based, at least in part, on secure communication needs of at least one of the communication system and the second communication system. In a non-limiting exemplary scenario, at least one of the communication system and the second communication system may desire the added security of a relatively narrow radiation pattern of a communication beam. In another exemplary scenario, at least one of the communication system and the second communication system may desire the added security of relatively low power emissions that may be advantageously provided by a MIMO configuration. Step 420 may, for example, comprise communicating security information between the communication system and the second communication system and negotiating an acceptable configuration.

Additionally for example, step 420 may comprise determining and analyzing a desired data rate for the communication, and determining whether to utilize the first or second configuration based, at least in part, on the desired data rate. In a non-limiting exemplary scenario, a beam-forming configuration may provide a relatively high antenna gain, which may correspond to a higher S/N ratio and higher data rate. In another exemplary scenario (e.g., in a multi-path environment with no clear path between the communication systems), a MIMO configuration may provide more reliable high-data-rate communications than a beam-forming configuration.

Still further for example, step 420 may comprise determining whether the first configuration is preferable to the second configuration based, at least in part, on dimensional characteristics of a communication cell that is associated with at least one of the communication system and the second communication system. For example and without limitation, the communication system emissions may be bounded by a cell dimension, and conforming to such cell dimensions may favor one of a beam-forming or a MIMO configuration (e.g., depending on the location of the second communication system within the cell). As a non-limiting example, an oblong-shaped cell may favor a beam-forming configuration between communication systems at the far ends of the cell and favor a MIMO configuration near the center of the cell.

Step 420 may, for example, comprise determining whether the first configuration is preferable to the second configuration based, at least in part, on geographical position of the second communication system. As mentioned previously, step 420 may comprise determining and considering the position of the second communication system (e.g., absolute position or position relative to the communication system) within a cell. Also for example, step 420 may comprise determining and considering the position of the second communication system relative to communication obstacles, signal barriers, interference sources, multi-path opportunities, etc.

Also for example, step 420 may comprise determining and analyzing antenna pattern information for at least one of the first and second communication systems, and determining whether to utilize the first or second configuration based, at least in part, on the antenna pattern information. In a non-limiting exemplary scenario, step 420 may comprise accessing and analyzing antenna pattern information for a particular communication beam to determine the gain characteristics in the vicinity of the second communication system. In another non-limiting exemplary scenario, step 420 may comprise accessing and analyzing antenna pattern information to determine whether a set of MIMO signals are likely to reach the second communication system at a desirable signal strength.

Additionally for example, step 420 may comprise determining and analyzing position of communicating entities other than the communication system and the second communication system, and determining whether to utilize the first or second configuration based, at least in part, on the position of communicating entities other than the communication system and the second communication system. As mentioned previously, such communicating entities may, for example and without limitation, be sources of interference or may represent security risks. Step 420 may, for example, comprise determining whether such communicating entities are currently communicating. In a non-limiting exemplary scenario, a communicating entity may be a significant source of noise during business hours, and step 420 may comprise determining to utilize a beam-forming configuration with a directional gain that minimizes interference from the communicating entity. In another non-limiting exemplary scenario, the communicating entity may be in-line between the communication system and the second communication system, and step 420 may comprise determining to utilize a MIMO configuration, since a beam-forming configuration might magnify the interference from the communicating entity.

Further for example, step 420 may comprise determining whether the first configuration is preferable to the second configuration based, at least in part, on multi-path communication environment between the communication system and the second communication system. For example and without limitation, a communication cell may comprise a relatively urban portion and a relatively rural portion (e.g., near the edge of a downtown district). In an exemplary scenario where the second communication system is near the relatively rural portion, step 420 may comprise determining to utilize a beam-forming configuration. In another exemplary scenario where the second communication system is in the relatively urban portion (e.g., surrounded by buildings in a relatively rich multi-path environment), step 420 may comprise determining to utilize a MIMO or MISO configuration.

Still further for example, step 420 may comprise determining and analyzing time-of-day information, and determining whether to utilize the first or second configuration based, at least in part, on the time-of-day information. As mentioned previously, interference sources may be time-dependent. Also for example, cell configuration and loading may be time-dependent. Energy or power availability and/or expected energy or power consumption may be time-dependent. Overall communication plans or restrictions (e.g., FCC restrictions) may be time-dependent. Generally, many of the factors discussed herein may comprise time-dependent characteristics, which step 420 may comprise considering.

Step 420 may, for example, comprise determining whether the first configuration is preferable to the second configuration based, at least in part, on input received from a user of at least one of the communication system and the second communication system. For example and without limitation, step 420 may comprise receiving input from a user of either the communication system or the second communication system that mandates a particular configuration. Also for example, step 420 may comprise receiving input from a user that specifies a preferred, but not mandated, configuration. Step 420 may comprise acquiring user input information in real-time from a user or may comprise acquiring user input information from a memory device in which such information is stored.

Also for example, step 420 may comprise determining whether the first configuration is preferable to the second configuration based, at least in part, on a predetermined communication profile associated with at least one of the communication system and the second communication system. Such a predetermined communication profile may, for example, comprise information as to which configuration to use in a variety of scenarios. For example and without limitation, a predetermined communication profile may specify a configuration to utilize during particular time windows. A predetermined communication profile may specify a configuration to utilize for a particular second communication system or particular location of the second communication system.

Further for example, step 420 may comprise determining and analyzing MIMO (or MISO) capability of the second communication system, and determining whether to utilize the first or second configuration based, at least in part, on the MIMO capability of the second communication system. For example, the second communication system may comprise no MIMO capability or only limited MIMO capability. In a non-limiting exemplary scenario, the second communication system may comprise only order-2 MIMO capability, where the communication system may comprise order-4 MIMO capability. Step 420 may then comprise considering the relatively limited nature of the order-2 MIMO capability (e.g., relative to the order-4 MIMO capability) when determining whether to utilize a beam-forming configuration or a MIMO configuration.

Still further for example, step 420 may comprise determining and analyzing respective signal qualities for communication utilizing the first and second configurations, and determining whether to utilize the first or second configuration based, at least in part, on the determined respective signal qualities. For example, step 420 may comprise determining expected signal strengths, signal-to-noise ratios or data error rates for information communicated utilizing various configurations and determine to utilize the configuration that corresponds to the lowest error rate or highest S/N ratio.

Also for example, step 420 may comprise determining and analyzing the need for a hand-off event, and determining whether to utilize the first or second configuration based, at least in part, on the need for a hand-off event. For example and without limitation, communication hand-offs (e.g., between access points, cellular base stations or different networks) may be preferably executed using a particular configuration. Step 420 may comprise determining to configure the communication system with the configuration that is preferred for a particular hand-off.

Also for example, step 420 may comprise determining whether the first configuration is preferable to the second configuration based, at least in part, on communication channel performance. Communication channel performance may, for example, be determined by channel estimation, performance prediction, performance monitoring, etc.

In general, step 420 may comprise determining whether communicating with the second communication system utilizing a plurality of antennas in a first configuration, which comprises a beam-forming configuration, is preferable to utilizing a plurality of antennas in a second configuration, which comprises either of a MIMO or MISO configuration. The previous examples represent a non-limiting set of examples, which may be added to or combined. Accordingly, the scope of various aspects of the present invention should not be limited by characteristics of the previous specific examples or by specific combinations of the previous specific examples.

The exemplary method 400 may, at step 430, comprise directing execution flow of the method 400 (e.g., in response to a determination made at step 420). For example, if step 420 determines that a beam-forming configuration is preferable to a MIMO (or MISO) configuration, then step 430 may direct execution flow to step 440. Also for example, if step 420 determines that a MIMO (or MISO) configuration is preferable to a beam-forming configuration, then step 430 may comprise directing execution flow to step 450.

The exemplary method 400 may, at step 440, comprise configuring the communication system to communicate with the second communication system by utilizing at least a portion of the plurality of antennas in a beam-forming configuration. As explained previously, a communication system may be configured in any of a variety of beam-forming configurations, a non-limiting illustrative example of which is generally shown at FIG. 3.

For example, step 440 may comprise determining characteristics of a desired communication beam. Step 440 may, for example, comprise determining the position of the second communication system and determining communication beam characteristics (e.g., antenna gain, radiation pattern or direction) desired for communication between the communication system and the second communication system. Step 440 may then, for example, comprise encoding and mapping signals, such that the signals transmitted from a plurality of antennas form a communication beam having the desired radiation pattern and direction. Step 440 may also, for example, comprise determining power at which to transmit respective signals from the plurality of antennas. Step 440 may thereby, for example, focus transmission energy toward the second communication system.

The exemplary method 400 may, at step 450, comprise configuring the communication system to communicate with the second communication system by utilizing at least a portion of the plurality of antennas in a MIMO (or MISO) configuration. As explained previously, a communication system may be configured in any of a variety of MIMO configurations, non-limiting illustrative examples of which are generally shown at FIGS. 1-2.

For example, step 450 may comprise performing MIMO channel encoding and mapping to generate desired output signals from a plurality of transceivers and associated antennas of the communication system. Also for example, step 450 may comprise communicating MIMO training information to the second communication system. Step 450 may comprise performing such communication in any of a variety of manners (e.g., temporarily utilizing a SISO or beam-forming configuration to communicate such information).

The exemplary method 400 may, at step 460, comprise performing continued processing. Such continued processing may comprise any of a large variety of characteristics. For example and without limitation, step 460 may comprise communicating information utilizing the communication system (e.g., as configured at steps 440 or 450). Also for example, step 460 may comprise looping execution of the method 400 back up to step 420 for re-determination.

The exemplary method 400 was presented to provide specific examples of generally broader aspects of the present invention. Accordingly, the scope of various aspects of the present invention should not be limited by particular characteristics of the exemplary method 400.

FIG. 5 is a diagram illustrating an exemplary method 500, in a communication system, for utilizing a plurality of antennas to communicate, in accordance with various aspects of the present invention. The exemplary method 500 may, for example and without limitation, share various characteristics with the exemplary method 400 illustrated in FIG. 4 and discussed previously. For example, the exemplary method 500 may be implemented in any of a variety of communication systems.

The exemplary method 500 may, at step 515, comprise configuring the communication system to utilize one of a first and second configuration for a communication, wherein the first configuration comprises a beam-forming configuration and the second configuration comprises either of a MIMO or MISO configuration. For example and without limitation, step 515 may share various characteristics with steps 440 and 450 of the exemplary method 400 illustrated in FIG. 4 and discussed previously.

The exemplary method 500 may, at step 517, comprise communicating a first portion of a communication with the second communication system utilizing the configuration established at step 515 (e.g., a beam-forming configuration or a MIMO or MISO configuration). A communication may comprise characteristics of any of a variety of types of communication. For example and without limitation, a communication may comprise a telephone call or a voice message. A communication may, for example, comprise audio, video, pictorial, graphical, data or textual information. The scope of various aspects of the present invention should not be limited by characteristics of any particular type of communication.

The exemplary method 500 may comprise, at step 520, while communicating the first portion of the communication, monitoring communication conditions to determine whether to communicate with the second communication system utilizing the other one of the first and second configurations. For example, in an exemplary scenario where step 515 configured the communication system in a beam-forming configuration, and step 517 is communicating a first portion of a communication with the second communication system utilizing the beam-forming configuration, step 520 may comprise monitoring communication conditions to determine whether to communicate with the second communication system utilizing a MIMO (or MISO) configuration rather than the present beam-forming configuration.

The communication conditions that step 520 may comprise monitoring may include any of a variety of conditions related to the communication of information. For example and without limitation, such communication conditions may comprise noise level, energy or power availability, energy or power utilization, data rate, error rate, general communication environment, system geographical position(s), time, user input, type of data, etc.

In a non-limiting exemplary scenario, step 520 may comprise monitoring geographical location of at least one of the communication system and the second communication system. Step 520 may, in the exemplary scenario, determine that the second communication system has moved from a rich urban multipath environment to a relatively wide-open rural environment that is less conducive to multi-path communications. Step 520 may, in the exemplary scenario, determine that the next portion of the communication should be communicated utilizing a beam-forming configuration.

In another non-limiting exemplary scenario, step 520 may comprise monitoring user input at one of the communication system and the second communication system. Step 520 may, in the exemplary scenario, comprise determining that a user of the second communication system has indicated a desire to switch communication configurations from a beam-forming configuration to a MIMO configuration (e.g., in response to communication issues that the user has detected but that the systems have not detected and/or remedied). Step 520 may, in the exemplary scenario, determine that the next portion of the communication should be communicated utilizing a MIMO configuration.

In general, step 520 may comprise, while communicating the first portion of the communication, monitoring communication conditions to determine whether to communicate with the second communication system utilizing a different configuration. Accordingly, the scope of various aspects of the present invention should not be limited by characteristics of any particular communication condition, manner of monitoring a communication condition, or manner of determining to utilize a different configuration.

The exemplary method 500 may, at step 530, comprise directing execution flow of the method 500 (e.g., in response to a determination made at step 520). For example, if step 520 determines that a different configuration is preferable to the current configuration, then step 530 may direct execution flow to step 540. Also for example, if step 520 determines that the current configuration is preferable to a different configuration, then step 530 may comprise directing execution flow to step 550.

The exemplary method 500 may, at step 540, comprise changing configurations. In an exemplary scenario, where step 515 comprised configuring the communication system in a MIMO configuration for a first portion of a communication, step 540 may comprise configuring the communication system in a beam-forming configuration for a second portion of the communication. In another exemplary scenario, where step 515 comprised configuring the communication system in a beam-forming configuration for a first portion of a communication, step 540 may comprise configuring the communication system in a MIMO configuration for a second portion of the communication.

Step 540 may, for example and without limitation, share various configuring characteristics with steps 440 and 450 of the exemplary method 400 illustrated in FIG. 4 and discussed previously. For example and without limitation, non-limiting examples of beam-forming and MIMO configurations were illustrated in FIGS. 1-3 and discussed previously.

For example, step 540 may comprise re-encoding and re-mapping signals to a plurality of antennas (e.g., and associated transceivers) of the communication system. Step 540 may also, for example, comprise communicating transitional information with the second communication system. Such transitional information may, for example, comprise synchronization information to indicate a point in the communication between the communication system and the second communication system at which a configuration transition may occur (e.g., packet, frame or time identifier). Such transitional information may also, for example, comprise various MIMO or MISO training information (e.g., to assist the communication systems in processing received information).

As mentioned previously, if step 520 determines that the current configuration is preferable to a different configuration, then step 530 may comprise directing execution flow of the method 500 to step 550. The exemplary method 500 may then, at step 550, comprise communicating a next portion of the communication utilizing the first configuration (e.g., the configuration established at step 515).

The exemplary method 500 may, at step 560, comprise performing continued processing. As discussed previously with regard to step 460 of the exemplary method 400 illustrated in FIG. 4, such continued processing may comprise any of a variety of characteristics. For example and without limitation, step 560 may comprise looping execution flow back up to step 520 for further monitoring to determine which configuration to utilize for a third portion of the communication (or a next communication). Also for example, step 560 may comprise performing any of a large variety of user interface and communication-related processing. Accordingly, the scope of various aspects of the present invention should not be limited by characteristics of any particular continued processing.

The exemplary method 500 was presented to provide specific examples of generally broader aspects of the present invention. Accordingly, the scope of various aspects of the present invention should not be limited by particular characteristics of the exemplary method 500.

FIG. 6 is a diagram illustrating an exemplary communication system 600 that utilizes a plurality of antennas to communicate, in accordance with various aspects of the present invention. The exemplary communication system 600 may, for example and without limitation share various functional characteristics with the exemplary methods 400, 500 illustrated in FIGS. 4-5 and discussed previously. Also for example and without limitation, the exemplary communication system 600 may share various characteristics with the exemplary MIMO and beam-forming systems illustrated in FIGS. 1-3 and discussed previously.

The exemplary communication system 600 may comprise characteristics of any of a variety of communication systems that comprise a plurality of antennas. For example and without limitation, the communication system 600 may comprise various systems, sub-systems and modules of a communication network (e.g., a base station, access point, or central controller). Also for example, the communication system 600 may comprise characteristics of a fixed or portable communication system that communicates with a communication network. Accordingly, the scope of various aspects of the present invention should not be limited by characteristics of a particular communication system.

The following discussion will refer to various modules and components. It should be recognized that various modules may be implemented in hardware and/or software. Additionally, various modules may share various hardware and/or software sub-modules. For example a first module and a second module may share a processor or codec. Also for example, a first module and a second module may share an initialization software routine or a common functional software sub-module. Accordingly, the scope of various aspects of the present invention should not be limited by characteristics of any particular module implementation or by any arbitrary boundary between modules or components.

The exemplary communication system 600 may comprise a configuration module 610 and a plurality of transceivers 640-650 with respective antennas 660-670. The configuration module 610 may comprise a signal processing module 612, which may perform any of a large variety of signal processing activities. The signal processing module 612 may, for example and without limitation, perform various processing in support of the configuration module 610 operation. Also for example, the signal processing module 612 may perform various user interface, communication, memory management and power management activities.

The configuration module 610 may comprise a MIMO module 614 that performs various aspects of MIMO communications. Such aspects may comprise, without limitation, MIMO encoding/decoding, MIMO mapping, etc. The MIMO module 614 may, for example and without limitation, share various characteristics with the exemplary MIMO systems 100, 200 illustrated in FIGS. 1-2 and discussed previously, or other known or to-be-developed MIMO (or MISO) systems.

The configuration module 610 may also comprise a beam-forming module 616 that performs various aspects of beam-forming communications. Such aspects may comprise, without limitation, beam-forming encoding, beam-forming mapping, etc. The beam-forming module 616 may, for example and without limitation, share various characteristics with the exemplary beam-forming system 300 illustrated in FIG. 3 and discussed previously, or other known or to-be-developed beam-forming systems.

The configuration module 610 may also, in various exemplary embodiments, comprise a communication condition monitor 619, which may monitor any of a variety of communication conditions during operation of the communication system 600.

Portions of the following discussion will include illustrations of the communication system 600 communicating with a second communication system. Such a one-to-one communication scenario is presented for illustrative clarity and should not limit the scope of various aspects of the present invention to characteristics of a one-to-one communication scenario. For example and without limitation, various aspects of the present invention also may apply to broadcast and multi-cast communication scenarios.

In an exemplary operating scenario, the configuration module 610 (e.g., the signal processing module 612) may determine whether communicating with a second communication system utilizing a plurality of antennas (e.g., a plurality of the first through Nth antennas 660-670) in a first configuration, which comprises a beam-forming configuration, is preferable to utilizing a plurality of antennas (e.g., a plurality of the first through Nth antennas 660-670) in a second configuration, which comprises either of a MIMO or MISO configuration. The configuration module 610 (e.g., the signal processing module 612) may share various functional characteristics with step 420 of the exemplary method 400 illustrated in FIG. 4 and discussed previously. For example, the configuration module 610 may make such determination in any of a variety of manners, non-limiting illustrative examples of which are presented below.

For example, the configuration module 610 may determine whether the first configuration is preferable to the second configuration based, at least in part, on energy or power consumption associated with utilizing the first configuration and energy or power consumption associated with utilizing the second configuration. For example, depending on the particular communication scenario, a beam-forming configuration may correspond to the utilization of more or less energy or power than a MIMO or MISO configuration. The configuration module 610 may (e.g., in an communication scenario involving a finite energy source) determine to utilize the configuration that corresponds with the lowest amount of energy or power utilization while meeting a particular quality goal. The configuration module 610 may also (e.g., in an communication scenario involving a finite energy source) determine and consider the amount of energy or power presently available for communication or anticipated to be available for communication.

Also for example, the configuration module 610 may determine whether the first configuration is preferable to the second configuration based, at least in part, on secure communication needs of at least one of the communication system 600 and the second communication system. In a non-limiting exemplary scenario, at least one of the communication system 600 and the second communication system may desire the added security of a relatively narrow radiation pattern of a communication beam. In another exemplary scenario, at least one of the communication system 600 and the second communication system may desire the added security of relatively low-power emissions that may be advantageously provided by a MIMO configuration. The configuration module 610 may, for example, communicate security information between the communication system 600 and the second communication system and negotiate an acceptable configuration.

Additionally for example, the configuration module 610 may determine and analyze a desired data rate for the communication, and determine whether to utilize the first or second configuration based, at least in part, on the desired data rate. In a non-limiting exemplary scenario, a beam-forming configuration may provide a relatively high antenna gain, which may correspond to a higher S/N ratio and higher data rate. In another exemplary scenario (e.g., in a multi-path environment with no clear path between the communication systems), a MIMO configuration may provide more reliable high-data-rate communications than a beam-forming configuration.

Still further for example, the configuration module 610 may determine whether the first configuration is preferable to the second configuration based, at least in part, on dimensional characteristics of a communication cell that is associated with at least one of the communication system and the second communication system. For example and without limitation, the communication system 600 emissions may be bounded by a cell dimension, and conforming to such cell dimensions may favor one of a beam-forming or a MIMO configuration (e.g., depending on the location of the second communication system within the cell). As a non-limiting example, an oblong-shaped cell may favor a beam-forming configuration between communication systems at the far ends of the cell and favor a MIMO configuration near the center of the cell.

The configuration module 610 may, for example, determine whether the first configuration is preferable to the second configuration based, at least in part, on geographical position of the second communication system. As mentioned previously, the configuration module 610 may determine and consider the position of the second communication system (e.g., absolute position or position relative to the communication system 600) within a cell. Also for example, the configuration module 610 may determine and consider the position of the second communication system relative to communication obstacles, signal barriers, interference sources, multi-path opportunities, etc.

Also for example, the configuration module 610 may determine and analyze antenna pattern information for at least one of the first 600 and second communication systems, and determine whether to utilize the first or second configuration based, at least in part, on the antenna pattern information. In a non-limiting exemplary scenario, the configuration module 610 may access and analyze antenna pattern information for a particular communication beam to determine the gain characteristics in the vicinity of the second communication system. In another non-limiting exemplary scenario, the configuration module 610 may access and analyze antenna pattern information to determine whether a set of MIMO signals are likely to reach the second communication system at a desirable signal strength.

Additionally for example, the configuration module 610 may determine and analyze position of communicating entities other than the communication system 600 and the second communication system, and determine whether to utilize the first or second configuration based, at least in part, on the position of communicating entities other than the communication system 600 and the second communication system. As mentioned previously, such communicating entities may, for example, be sources of interference or may represent security risks. The configuration module 610 may, for example, determine whether such communicating entities are currently communicating. In a non-limiting exemplary scenario, a communicating entity may be a significant source of noise during business hours, and the configuration module 610 may determine to utilize a beam-forming configuration with a directional gain that minimizes interference from the communicating entity. In another non-limiting exemplary scenario, the communicating entity may be in-line between the communication system 600 and the second communication system, and the configuration module 610 may determine to utilize a MIMO configuration, since a beam-forming configuration might magnify the interference from the communicating entity.

Further for example, the configuration module 610 may determine whether the first configuration is preferable to the second configuration based, at least in part, on multi-path communication environment between the communication system 600 and the second communication system. For example and without limitation, a communication cell may comprise a relatively urban portion and a relatively rural portion (e.g., near the edge of a downtown district). In an exemplary scenario where the second communication system is near the relatively rural portion, the configuration module 610 may determine to utilize a beam-forming configuration. In another exemplary scenario where the second communication system is in the relatively urban portion (e.g., surrounded by buildings in a relatively rich multi-path environment), the configuration module 610 may determine to utilize a MIMO or MISO configuration.

Still further for example, the configuration module 610 may determine and analyze time-of-day information, and determine whether to utilize the first or second configuration based, at least in part, on the time-of-day information. As mentioned previously, interference sources may be time-dependent. Also for example, cell configuration and loading may be time-dependent. Energy or power availability and/or expected energy or power consumption may be time-dependent. Overall communication plans or restrictions (e.g., FCC restrictions) may be time-dependent. Generally, many of the factors discussed herein may comprise time-dependent characteristics, which the configuration module 610 may consider.

The configuration module 610 may, for example, determine whether the first configuration is preferable to the second configuration based, at least in part, on input received from a user of at least one of the communication system 600 and the second communication system. For example and without limitation, the configuration module 610 may receive input from a user of either the communication system 600 or the second communication system that mandates a particular configuration. Also for example the configuration module 610 may receive input from a user that specifies a preferred, but not mandated, configuration. The configuration module 610 may acquire user input information in real-time from a user or may acquire user input information from a memory device in which such information is stored.

Also for example, the configuration module 610 may determine whether the first configuration is preferable to the second configuration based, at least in part, on a predetermined communication profile associated with at least one of the communication system 600 and the second communication system. Such a predetermined communication profile may, for example, comprise information as to which configuration to use in a variety of scenarios. For example and without limitation, a predetermined communication profile may specify a configuration to utilize during particular time windows. A predetermined communication profile may specify a configuration to utilize for a particular second communication system or particular location of the second communication system.

For example, the configuration module 610 may determine whether the first configuration is preferable to the second configuration based, at least in part, on communication channel performance. Communication channel performance may, for example, be determined by channel estimation, performance prediction, performance monitoring, etc.

Further for example, the configuration module 610 may determine and analyze MIMO (or MISO) capability of the second communication system, and determining whether to utilize the first or second configuration based, at least in part, on the MIMO capability of the second communication system. For example, the second communication system may comprise no MIMO capability or only limited MIMO capability. In a non-limiting exemplary scenario, the second communication system may comprise only order-2 MIMO capability, where the communication system 600 may comprise order-4 MIMO capability. The configuration module 610 may then consider the relatively limited nature of the order-2 MIMO capability (e.g., relative to the order-4 MIMO capability) when determining whether to utilize a beam-forming configuration or a MIMO configuration.

Still further for example, the configuration module 610 may determine and analyze respective signal qualities for communication utilizing the first and second configurations, and determining whether to utilize the first or second configuration based, at least in part, on the determined respective signal qualities. For example, the configuration module 610 may determine expected signal strengths, signal-to-noise ratios or data error rates for information communicated utilizing various configurations, and determine to utilize the configuration that corresponds to the lowest error rate or highest S/N ratio.

Also for example, the configuration module 610 may determine and analyze the need for a hand-off event, and determine whether to utilize the first or second configuration based, at least in part, on the need for a hand-off event. For example and without limitation, communication hand-offs (e.g., between access points, cellular base stations or different networks) may be preferably executed using a particular configuration. The configuration module 610 may determine to configure the communication system 600 with the configuration that is preferred for a particular hand-off.

In general, the configuration module 610 may determine whether communicating with the second communication system utilizing a plurality of antennas in a first configuration, which comprises a beam-forming configuration, is preferable to utilizing a plurality of antennas in a second configuration, which comprises either of a MIMO or MISO configuration. The previous examples represent a non-limiting set of examples, which may be added to or combined. Accordingly, the scope of various aspects of the present invention should not be limited by characteristics of the previous specific examples or by specific combinations of the previous specific examples.

If the configuration module 610 determines that a beam-forming configuration is preferable to a MIMO (or MISO) configuration, then the configuration module 610 may configure the communication system 600 to communicate with the second communication system by utilizing a plurality of antennas (e.g., at least a portion of the plurality of antennas 660-670) in a beam-forming configuration. The configuration module 610 may, for example, utilize the beam-forming module 616 to perform various aspects of communication in such a beam-forming configuration. As explained previously, a communication system may be configured in any of a variety of beam-forming configurations, a non-limiting illustrative example of which is generally shown at FIG. 3. For example and without limitation, the configuration module 610 (e.g., operating in conjunction with the beam-forming module 616) may share various functional characteristics with step 440 of the exemplary method 400 illustrated in FIG. 4 and discussed previously.

For example, the configuration module 610 may determine characteristics of a desired communication beam. The configuration module 610 may, for example, determine the position of the second communication system and determine communication beam characteristics (e.g., antenna gain, radiation pattern or direction) desired for communication between the communication system 600 and the second communication system. The configuration module 610 may then, for example, utilize the beam-forming module 616 (or portions thereof) to encode and map signals, such that the signals transmitted from a plurality of antennas (e.g., the plurality of antennas 660-670) form a communication beam having the desired radiation pattern and direction. The configuration module 610 may also, for example, determine power at which to transmit respective signals from the plurality of antennas. The configuration module 610 may thereby, for example, focus transmission energy toward the second communication system.

If the configuration module 610 determines that a MIMO (or MISO) configuration is preferable to a beam-forming configuration, then the configuration module 610 may configure the communication system 600 to communicate with the second communication system by utilizing a plurality of antennas (e.g., at least a portion of the plurality of antennas 660-670) in a beam-forming configuration. The configuration module 610 may, for example, utilize the MIMO module 614 to perform various aspects of communication in such a MIMO configuration. As explained previously, a communication system may be configured in any of a variety of MIMO configurations, non-limiting illustrative examples of which are generally shown at FIGS. 1-2. For example and without limitation, the configuration module 610 (e.g., operating in conjunction with the MIMO module 614) may share various functional characteristics with step 450 of the exemplary method 400 illustrated in FIG. 4 and discussed previously.

For example, the configuration module 610 may utilize the MIMO module 614 (or portions thereof) to perform MIMO channel encoding and mapping to generate desired output signals for a plurality of transceivers (e.g., at least a portion of the plurality of transceivers 640-650) and associated antennas (e.g., at least a portion of the plurality of antennas 660-670) of the communication system 600. Also for example, the configuration module 610 may communicate MIMO training information to the second communication system. The configuration module 610 may perform such communication in any of a variety of manners (e.g., temporarily utilizing a SISO or beam-forming configuration to communicate such information).

The previous exemplary operating scenario was presented to provide specific examples of generally broader aspects of the present invention. Accordingly, the scope of various aspects of the present invention should not be limited by particular characteristics of the exemplary operating scenario.

In a second exemplary operating scenario, the configuration module 610 may (e.g., utilizing the beam-forming module 616 and/or the MIMO module 614) configure the communication system 600 to utilize one of a first and second multi-antenna configuration for a communication, wherein the first configuration comprises a beam-forming configuration and the second configuration comprises either of a MIMO or MISO configuration. For example and without limitation, the configuration module 610 (e.g., in conjunction with the beam-forming module 616 and the MIMO module 614) may share various functional characteristics with step 515 of the exemplary method 500 illustrated in FIG. 5 and discussed previously.

The communication system 600 may then, for example, communicate a first portion of a communication with the second communication system utilizing the established configuration (e.g., a beam-forming configuration or a MIMO or MISO configuration). The communication system 600 may, for example and without limitation, share various functional characteristics with step 517 of the exemplary method 500 illustrated in FIG. 5 and discussed previously. The communication system 600 may, for example, utilize a plurality of transceivers (e.g., at least a portion of the plurality of transceivers 640-650) and associated antennas (e.g., at least a portion of the plurality of antennas 660-670) to perform such communication.

As mentioned previously, a communication may comprise characteristics of any of a variety of types of communication. For example and without limitation, a communication may comprise a telephone call or a voice message. A communication may, for example, comprise audio, video, pictorial, graphical, data or textual information. The scope of various aspects of the present invention should not be limited by characteristics of any particular type of communication.

The configuration module 610 may (e.g., utilizing the communication condition monitor module 619), while communicating the first portion of the communication, monitor communication conditions to determine whether to communicate with the second communication system utilizing the other one of the first and second configurations. The configuration module 610 (e.g., in conjunction with the communication condition monitor module 619) may share various functional characteristics with step 520 of the exemplary method 500 illustrated in FIG. 5 and discussed previously.

For example, in an exemplary scenario where the configuration module 610 configured the communication system 600 in a beam-forming configuration, and the communication system 600 is communicating a first portion of a communication with the second communication system utilizing the beam-forming configuration, the configuration module 610 may utilize the communication condition monitor module 619 to monitor communication conditions and process the result of such monitoring to determine whether to communicate with the second communication system utilizing a MIMO (or MISO) configuration rather than the present beam-forming configuration.

The communication conditions that the configuration module 610 (e.g., the communication condition monitor module 619) may monitor may include any of a variety of conditions related to the communication of information. For example and without limitation, such communication conditions may comprise noise level, energy or power availability, energy or power utilization, data rate, error rate, general communication environment, system geographical position(s), time, user input, type of data, etc.

In general, the configuration module 610 may, while communicating the first portion of the communication, monitor communication conditions to determine whether to communicate with the second communication system utilizing a different configuration. Accordingly, the scope of various aspects of the present invention should not be limited by characteristics of any particular communication condition, manner of monitoring a communication condition, or manner of determining to utilize a different configuration.

If the configuration module 610 determines to utilize a different configuration to communicate with the second communication system, then the configuration module 610 may configure the communication system 600 to communicate utilizing the different configuration. The configuration module 610 (e.g., in conjunction with the MIMO module 614 and/or the beam-forming module 616) may, for example and without limitation, share various functional characteristics with step 540 of the exemplary method 500 illustrated in FIG. 5 and discussed previously.

In an exemplary scenario, where the configuration module 610 previously configured the communication system 600 in a MIMO configuration (e.g., utilizing the MIMO module 614) for a first portion of a communication, the configuration module 610 may configure the communication system 600 in a beam-forming configuration (e.g., utilizing the beam-forming module 616) for a second portion of the communication. In another exemplary scenario, where the configuration module 610 previously configured the communication system 600 in a beam-forming configuration for a first portion of a communication, the configuration module 610 may configure the communication system 600 in a MIMO configuration for a second portion of the communication.

For example, the configuration module 610 may (e.g., utilizing the MIMO module 614 and/or the beam-forming module 616) re-encode and/or re-map signals to a plurality of antennas (e.g., and associated transceivers) of the communication system 600. The configuration module 610 may also, for example, communicate transitional information with the second communication system. Such transitional information may, for example, comprise synchronization information to indicate a point in the communication between the communication system and the second communication system at which a configuration transition may occur (e.g., packet, frame or time identifier). Such transitional information may also, for example, comprise various MIMO or MISO training information (e.g., to assist the communication systems in decoding received information).

If the configuration module 610 determines to continue to utilize the same configuration to communicate with the second communication system, then the communication system 600 may continue to communicate with the second communication system utilizing the same configuration.

During communication with the second communication system, the configuration module 610 may continue to monitor and/or reconfigure the communication system 600 as needed. For example, the configuration module 610 may continue monitoring communication conditions to determine which configuration to utilize for a third portion of the communication or for a next communication.

The exemplary system 600 was presented to provide specific examples of generally broader aspects of the present invention. Accordingly, the scope of various aspects of the present invention should not be limited by particular characteristics of the exemplary system 600.

The various components and/or modules of the exemplary communication system 600 may be distributed or may be integrated in various degrees of integration. For example and without limitation, the configuration module 610 may be integrated into a single integrated circuit. Also for example, the plurality of transceivers 640-650 (or portions thereof) may also be integrated with the configuration module 610 into a single integrated circuit. Accordingly, the scope of various aspects of the present invention should not be limited by characteristics of a particular type or degree of system integration.

In summary, various aspects of the present invention provide a system and method for utilizing MIMO (or MISO) and beam-forming capability in a multi-antenna communication system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A device comprising:
a memory comprising a communication profile;
communication interface circuitry operable to support a Multiple-Input-Multiple-Output (MIMO) configuration and a beam-forming configuration; and
configuration circuitry operable to:
access the communication profile to determine a required data-rate to support an upcoming communication using the communication interface circuitry;
responsive to the required data-rate, determine a relationship between a first transfer data-rate capability of the MIMO configuration and a second transfer data-rate capability of the beam-forming configuration, by comparing the first transfer data-rate capability of the MIMO configuration with the second transfer data-rate capability of the beam-forming configuration taking into consideration a geographic location affecting data transfer rates;
responsive to the relationship, determine whether to perform the upcoming communication using the MIMO configuration or the beam-forming configuration; and
responsive to the determination:
establish the MIMO configuration in the communication interface circuitry for performing the upcoming communication when the MIMO configuration is selected; and establish the beam-forming configuration in the communication interface circuitry for performing the upcoming communication when the beam-forming configuration is selected.

2. The device of claim 1, wherein the upcoming communication comprises a voice call.

3. The device of claim 1, wherein the configuration circuitry is configured to map data from the upcoming communication to an antenna group responsive to the determination.

4. The device of claim 1, wherein the MIMO configuration implements a first number of antennas and the beam-forming configuration implements a second number of antennas different from the first.

5. The device of claim 1, wherein the geographic location comprises an urban environment.

6. The device of claim 1, wherein the geographic location comprises a rural environment.

7. The device of claim 1, further comprising serial-to-parallel converter circuitry configured to convert a serial data stream into multiple parallel data streams when the MIMO configuration is selected.

8. A system comprising:
a memory comprising a communication profile;
a communication resource; and
configuration circuitry configured to:
obtain data for a planned communication to a destination communication system;
access the communication profile to determine a demanded data-rate to support the planned communication to the destination system;
responsive to the demanded data-rate, determine a relationship between a first transfer data-rate capability of a Multiple-Input-Multiple-Output (MIMO) configuration and a second transfer data-rate capability of a beam-forming configuration, by comparing the first transfer data-rate capability of the MIMO configuration with the second transfer data-rate capability of the beam-forming configuration taking into consideration a geographic location affecting data transfer rates;
responsive to the relationship, determine a selected communication configuration that supports the demanded data-rate from among possible communication configurations, where the possible communication configurations comprise the MIMO configuration and the beam-forming configuration;
configure the communication resource according to the selected communication configuration; and
communicate the data during the planned communication to the destination communication system using the communication resource.

9. The system of claim 8, wherein the configuration circuitry is configured to map the data to an antenna group responsive to the selected communication configuration.

10. The system of claim 8, wherein the data comprises voice call data.

11. The system of claim 8, where the configuration circuitry is further configured to:
determine a multipath characteristic responsive to an indication of a geographic location; and
update the selected configuration responsive to the multipath characteristic.

12. The system of claim 8, where:
the configuration circuitry is configured to perform a comparison of the first and second transfer data-rate capabilities with a third transfer data-rate capability of a Multiple-Input Single Output (MISO) configuration; and
the possible communication configurations further comprise the MISO configuration.

13. A device comprising:
a memory comprising a communication profile; and
configuration circuitry configured to:
receive data to communicate to a remote communication system;
determine a relationship between a first transfer data-rate capability of a Multiple-Input-Multiple-Output (MIMO) configuration and a second transfer data-rate capability of a beam-forming configuration, by comparing the first transfer data-rate capability of the MIMO configuration with the second transfer data-rate capability of the beam-forming configuration taking into consideration a geographic location affecting data transfer rates;

responsive to the relationship, access data-rate information within the communication profile to determine to perform a planned communication using a selected configuration from among the MIMO configuration and the beam-forming configuration that supports a data-rate demand of the planned communication;

configure a communication resource according to the selected configuration; and communicate the data to the remote communication system using the selected configuration during the planned communication.

14. The device of claim 13, wherein the geographic location comprises an urban environment.

15. The device of claim 13, wherein the geographic location comprises a rural environment.

16. The device of claim 13, where the configuration circuitry is configured to:

monitor a multipath characteristic after the communication resource is configured according to the selected configuration; and responsive to a change in a clear-path characteristic, update the selected configuration.

17. The device of claim 13, where the configuration circuitry is configured to map the data to an antenna group responsive to the selected configuration.

18. The device of claim 17, where the configuration circuitry is configured to map the data to the antenna group responsive to the selected configuration by converting a serial data stream into multiple parallel data streams.

* * * * *